US012592658B2

(12) United States Patent (10) Patent No.: US 12,592,658 B2
Wagner et al. (45) Date of Patent: Mar. 31, 2026

(54) METHOD FOR OPERATING AN ELECTRIC MACHINE, DEVICE FOR OPERATING AN ELECTRIC MACHINE, AND ELECTRIC DRIVE SYSTEM

(71) Applicant: Robert Bosch GmbH, Stuttgart (DE)

(72) Inventors: Phillip Wagner, Ludwigsburg (DE); Gunther Goetting, Stuttgart (DE); Michele Hirsch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 18/254,919

(22) PCT Filed: Oct. 6, 2021

(86) PCT No.: PCT/EP2021/077577
§ 371 (c)(1),
(2) Date: May 30, 2023

(87) PCT Pub. No.: WO2022/117247
PCT Pub. Date: Jun. 9, 2022

(65) Prior Publication Data
US 2024/0014756 A1 Jan. 11, 2024

(30) Foreign Application Priority Data
Dec. 1, 2020 (DE) ..................... 10 2020 215 128.8

(51) Int. Cl.
H02P 21/18 (2016.01)
H02P 21/08 (2016.01)
(Continued)

(52) U.S. Cl.
CPC .............. H02P 21/18 (2016.02); H02P 21/08 (2013.01); H02P 21/20 (2016.02); H02P 21/22 (2016.02)

(58) Field of Classification Search
CPC .......... H02P 21/18; H02P 21/08; H02P 21/20; H02P 21/22; H02P 6/08; H02P 23/12; H02P 6/34
See application file for complete search history.

(56) References Cited

U.S. PATENT DOCUMENTS

2008/0116842 A1     5/2008  Cheng et al.
2021/0175832 A1*    6/2021  Khan ...................... H02P 27/08

FOREIGN PATENT DOCUMENTS

DE       102014220208 A1    5/2016
WO         2012013447 A2    2/2012

OTHER PUBLICATIONS

Translation of International Search Report for Application No. PCT/EP2021/077577 dated Jan. 5, 2022 (2 pages).

* cited by examiner

*Primary Examiner* — Bickey Dhakal
(74) *Attorney, Agent, or Firm* — Michael Best & Friedrich LLP

(57) ABSTRACT

The invention relates to a method for operating an electric machine (2), in particular in a motor vehicle, the machine (2) comprising a rotatably mounted rotor and a motor winding that is electrically connected to an electrical energy store (4) by means of a power electronics (3). In said method, by triggering the power electronics (3), the electric machine (2) is controlled in a field-oriented manner in such a way that the machine (2) generates a specified desired torque ($T_{target}$). According to the invention, when it is ascertained that based on a current actual working point (AP1) of the electric machine (2) a specified desired working point (AP2) of the electric machine (2) should be set at least substantially in a time-optimized manner, a predicted pilot control action is (Continued)

specified, and that the desired working point (AP2) is set by triggering the power electronics (3) according to the predicted pilot control action.

16 Claims, 3 Drawing Sheets

(51)  Int. Cl.
 *H02P 21/20*          (2016.01)
 *H02P 21/22*          (2016.01)

METHOD FOR OPERATING AN ELECTRIC MACHINE, DEVICE FOR OPERATING AN ELECTRIC MACHINE, AND ELECTRIC DRIVE SYSTEM

BACKGROUND

The invention relates to a method for operating an electric machine, in particular in a motor vehicle, the machine comprising a rotatably mounted rotor and a motor winding, the motor winding being electrically connected to an electrical energy store by means of a power electronics, and, by triggering the power electronics, the electric machine being controlled in a field-oriented manner in such a way that the machine generates a specified desired torque.

In addition, the invention relates to a device for operating an electrical machine having a control device.

The invention further relates to an electric drive system.

An electric machine typically comprises a rotatably mounted rotor and a motor winding. The rotor can in this case be driven or rotated by means of a suitable powering of the motor winding. For example, the motor winding is a housing-fixed stator winding arranged in a distributed manner around the rotor. In order to achieve a desired powering of the motor winding, the motor winding is typically electrically connected to an electrical energy store by means of a power electronics. The powering of the motor winding is then controlled by triggering switching elements of the power electronics.

From the prior art, it is known to control an electric machine in a field-oriented manner by triggering the power electronics in a such way that the machine generates a specified desired torque. A desired torque that should be generated by the machine is thus specified, and the machine is operated by means of a field-oriented control. In the context of a field-oriented control, an actual power vector is conventionally ascertained according to sinusoidal, electric actual phase currents of the motor winding by means of a d/q transformation. The actual power vector describes the actual phase currents as a uniform size in a rotor-fixed coordinate system. A torque-forming power iq forms a first directional component of the actual power vector. A flow-forming power id forms a second directional component of the actual power vector. In addition, a desired power vector is ascertained according to the desired torque, and the power electronics are triggered in a controlled manner such that a difference between the desired power vector on the one hand and the actual power vector on the other hand is reduced or minimized.

SUMMARY

The method according to the invention is characterized in that, when it is ascertained that based on a current actual working point of the electric machine, a specified desired working point of the electric machine should be set at least substantially in a time-optimized manner, a predicted pilot control action is specified, and that the desired working point is set by triggering the power electronics according to the predicted pilot control action. Thus, if it is ascertained that the desired working point should be set in a time-optimized manner, i.e., as quickly as possible, the power electronics are controlled according to the predicted pilot control action. As a result, the desired working point can be set faster than with field-oriented control. The field-oriented control is preferably suspended when it is ascertained that the specified desired working point should be set in a time-optimized manner. Preferably, as a pilot control action, a control sequence is predicted comprising a plurality of triggering signals for the switching elements of the power electronics. Alternatively, as a pilot control action, a control sequence is preferably predicted comprising a plurality of desired voltage vectors. According to the desired voltage vectors, the triggering signals for the switching elements are then ascertained. A desired power working point of the electric machine is preferably specified as the desired working point. Each power working point of the electric machine corresponds to a different power vector in each case.

According to one preferred embodiment, it is provided that the pilot control action is predicted according to the current actual working point in the operation of the electric machine. The pilot control action is thus predicted "online" according to the current actual working point. This results in the advantage that a suitable pilot control action can be predicted for any current actual working points. Accordingly, the specified desired working point can be set in a time-optimized manner based on any desired current actual working points. Preferably, the pilot control action predicted in the operation of the electric machine is intermediately stored for a specified amount of time, i.e. temporarily, so that the predicted pilot control action is available for the specified amount of time and can be specified.

Preferably, the pilot control action is predicted in pilot control action tests and stored in a data memory associated with the machine. The pilot control action is thus predicted "offline", e.g., in the application of the electric machine in the plant. Accordingly, the pilot control action in the operation of the electric machine need not be predicted. This results in the advantage that no computational capacity for predicting the pilot control action must be reserved in a control device designed to determine the triggering signals for the power electronics. This results in the further advantage that the pilot control action is available more quickly compared to the prediction during operation of the electric machine.

According to one preferred embodiment, it is provided that a pilot control action is respectively predicted for a plurality of potential desired working points. This results in the advantage that different desired working points can be set particularly quickly as needed. If the pilot control actions are predicted in the operation of the electric machine, the potential desired working points are preferably prioritized. According to the prioritization, a pilot control action is then sequentially predicted for the potential desired working points in each case. Preferably, a pilot control action is respectively predicted for a plurality of potential actual working points. A plurality of potential actual working points are thus specified, and a respective pilot control action is predicted for these actual working points. This is particularly advantageous when the pilot control actions are predicted in pilot control action tests. For example, a plurality of potential actual working points are predicted, each lying on a MTPA (maximum torque per ampere) curve of the electric machine, and a pilot control action is predicted for each of these actual working points. If a pilot control action is predicted for a plurality of actual working points and/or a plurality of desired working points, the pilot control actions are preferably stored in a characteristic map.

According to one preferred embodiment, a sensor signal of a sensor is compared to a specified threshold value and that it is ascertained according to the comparison whether the desired working point should be set at least substantially in a time-optimized manner. For example, it is ascertained that the desired working point should be set at least substantially in a time-optimized manner when the sensor signal exceeds the threshold value or if the sensor signal falls below the threshold value. Preferably, the comparison is based on the sensor signal of a sensor designed to monitor an environment of the machine or an environment of a device comprising the machine. Alternatively or additionally, the comparison is preferably based on the sensor signal of a sensor designed to monitor an actuation of an operating device associated with the machine.

According to a preferred embodiment, it is provided that, as a desired working point, a working point is specified in which the machine generates a regenerative deceleration torque, whereby, upon detection of an emergency braking situation, it is ascertained that the desired working point should be set at least substantially in a time-optimized manner. This results in the advantage that the generative deceleration torque is generated particularly quickly by the machine, so that ultimately the braking distance of the motor vehicle comprising the machine is reduced. Preferably, the emergency braking situation is sensed according to a sensor signal of an environmental sensor of an environmental sensor system of the motor vehicle. Alternatively, the emergency braking situation is sensed according to an actuation of a braking pedal of the motor vehicle. For example, it is ascertained that the emergency braking situation is present when a sensor associated with the braking pedal detects that an actuation speed of the braking pedal exceeds a specified threshold. In this case, the working point in which the electric machine generates a maximum generative deceleration torque is preferably set as a desired working point. Alternatively, a working point is specified in which the machine generates a lower generative deceleration torque, e.g., a deceleration torque that is 80% of the maximum generative deceleration torque.

According to one preferred embodiment, it is provided that, as a desired working point, a working point is specified in which the machine generates an acceleration torque, whereby, upon detection of a maximum dynamic default, it is ascertained that the desired working point should be set at least substantially in a time-optimized manner. This results in the advantage that the acceleration torque is generated particularly quickly, so that the acceleration of the motor vehicle is ultimately increased. Preferably, the maximum dynamic default is sensed according to actuation of an acceleration pedal of the motor vehicle. For example, it is ascertained that the maximum dynamic default is present when a sensor associated with the acceleration pedal detects that an actuation speed of the acceleration pedal exceeds a specified threshold. In this case, the working point in which the electric machine generates a maximum acceleration torque is preferably specified as a desired working point. Alternatively, a working point is specified in which the machine generates a lower acceleration torque, e.g., an acceleration torque that is 80% of the maximum acceleration torque.

Further advantageous desired working points are also possible. For example, as a desired working point, the working point is specified in which the machine, upon maximum field weakening, generates the same torque as in the current working point.

Preferably, the desired working point is specified according to a state of charge of the energy store. The consideration of the state of charge of the energy store is particularly advantageous when, as a desired working point, the working point is specified in which the electric machine generates a generative deceleration torque. For example, if the state of charge of the energy store device is high, a generative operation of the electric machine could lead to an overcharging of the energy store. Accordingly, as a desired working point, a working point is preferably specified which leads to large internal losses in the electric machine and the power electronics as well as a lower power in the direction of the energy store. The efficiency for the recuperated energy is then lower, and the energy store must absorb less electrical energy at the same generative deceleration torque. Accordingly, when the energy store is in a low state of charge, as a desired working point, the working point is preferably specified which leads to low internal losses in the electric machine and the power electronics.

According to one preferred embodiment, it is provided that a desired trajectory for the actual power vector is ascertained, whereby the desired trajectory extends from the actual working point to the desired working point, and the pilot control action is predicted according to the desired trajectory such that the curve of the actual power vector at least substantially corresponds to the desired trajectory when setting the desired working point. Based on the desired trajectory, a pilot control action which causes a time-optimized setting of the desired working point can be particularly precisely predicted.

Preferably, the desired trajectory is ascertained according to a model of the electric machine. The ego dynamics of the electric machine are therefore considered when determining the desired trajectory. In particular, the model of the electric machine describes the correlation between the electrical clamping voltages applied to the phases of the motor winding on the one hand and the phase currents caused by the clamping voltages on the other hand. For example, the model contains information regarding the inductances as well as the electrical resistances of the electric machine.

According to one preferred embodiment, it is provided that a threshold power value is specified and that the desired trajectory is ascertained according to the threshold power value such that a power value of the power vector always falls below the threshold power value when setting the desired working point. Power values that exceed the threshold power value are thus avoided. Such high power values could lead to a demagnetization of permanent magnets of the rotor and are accordingly undesirable.

Preferably, a threshold voltage value is specified, the desired trajectory being ascertained according to the threshold voltage such that voltage values of electrical clamping voltages of the machine always fall below the threshold voltage value when setting the desired working point. This, too, avoids an overcharging of the electric machine.

According to a preferred embodiment, it is provided that the desired trajectory is ascertained by a model predictive controller. Model predictive control (MPC) is generally known from the prior art. A time-optimized desired trajectory can be precisely ascertained by the model predictive controller, so that a setting of the desired working point that is at least substantially time-optimized is achieved by the pilot control action that is predicted according to the desired trajectory. Preferably, the model predictive controller ascertains the desired trajectory according to the model of the machine, the specified threshold power value, and the specified threshold voltage value. Preferably, the pilot control action is predicted by the model predictive controller.

The device according to the invention for operating an electric machine comprising a rotatably mounted rotor and a motor winding, the motor winding being electrically connected to an electrical energy store by means of a power electronics, by a control device specifically designed to perform the method according to the invention when used as intended. Thus, if the control device is used as intended, the method according to the invention is performed in the control device or by the control device. This, too, results in the aforementioned advantages. Preferably, the control device is designed as a microcontroller.

According to one preferred embodiment, it is provided that the control device comprises a first computing unit and a second computing unit, the first computing unit comprising a power controller, and the second computing unit comprising a model predictive controller. The power controller is designed to control the machine in a field-oriented manner. The model predictive controller is designed to determine the desired trajectory and preferably to predict the pilot control action. Given that different computing units are used for the model predictive controller and the power controller, the model predictive controller can be integrated into an existing control device designed to control a machine in a field-oriented manner without fundamentally altering the existing software structure. In particular, the computing units differ in terms of their clock rate.

Preferably, the clock rate of the first computing unit is greater than the clock rate of the second computing unit.

The electric drive system according to the invention comprises an electric machine comprising a rotatably mounted rotor and a motor winding, the motor winding being electrically connected to an electrical energy store by means of a power electronics. The drive system is characterized by means of the device according to the invention for operating the electric machine. This, too, results in the aforementioned advantages.

BRIEF DESCRIPTION OF THE DRAWINGS

The invention will be explained in more detail in the following with reference to the drawings. Shown are.

DETAILED DESCRIPTION

Figure 1:
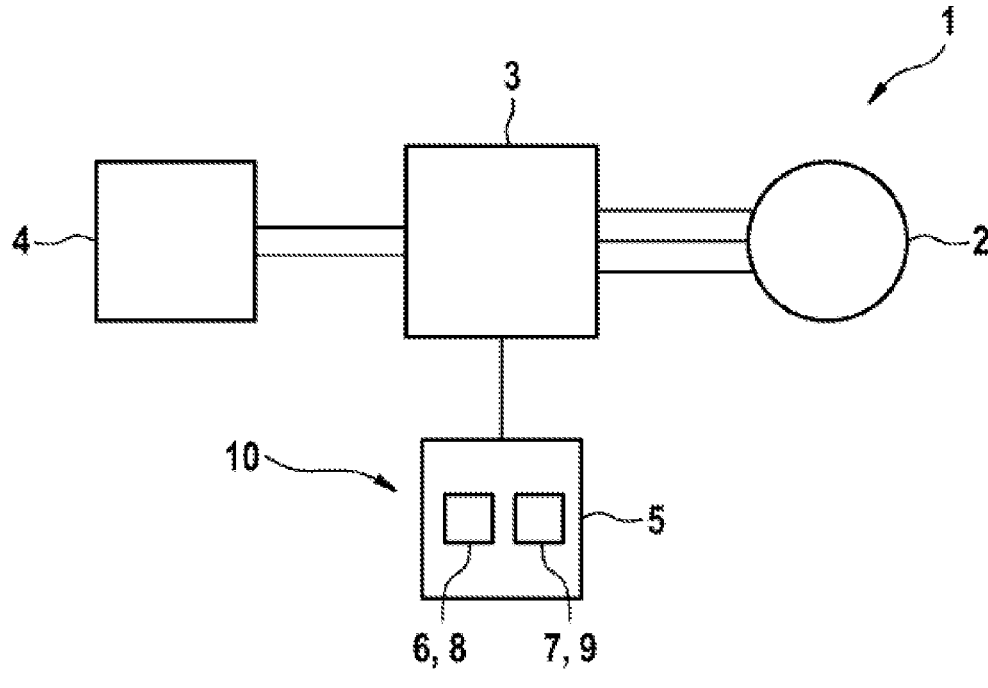
FIG. 1 an electric drive system.

FIG. 1 shows a schematic diagram of an electric drive system 1 of a motor vehicle (not shown in further detail).

The drive system 1 comprises an electric machine 2. The electric machine 2 comprises a rotatably mounted rotor. The electric machine 2 further comprises a stator winding as a motor winding. The stator winding is arranged in a distributed manner around the rotor such that the rotor is rotatable by a suitable powering of the stator winding. In the present case, the stator winding comprises three phases.

The drive system 1 also comprises a power electronics 3 having a plurality of switching elements. The stator winding is electrically connected to an electrical energy store 4 of the drive system 1 by the power electronics 3.

The drive system 1 also comprises a device 10 having a control device 5. In the present case, the control device 5 is a microcontroller 5. The control device 5 is designed to drive the switching elements of the power electronics 3 in order to achieve a desired powering of the phases of the stator winding.

The control device 5 comprises a first computing unit 6 and a second computing unit 7. The first computing unit 6 comprises a power controller 8. The second computing unit 7 comprises a model predictive controller 9. The control device 5 is designed to determine triggering signals for the switching elements of the power electronics 3 by means of the controllers 8 and 9 and to trigger the switching elements according to the ascertained triggering signals, as will be explained in further detail below in relation to FIG. 2.

Figure 2:
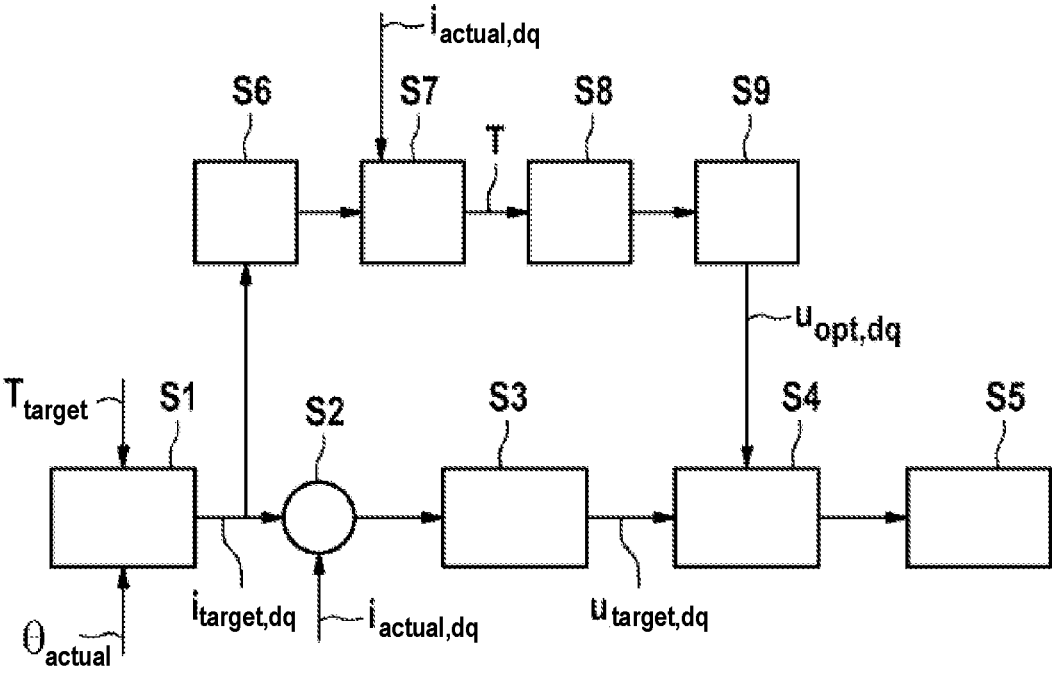
FIG. 2 a method for operating an electric machine of the drive system.

FIG. 2 shows an advantageous method for operating the electric machine 2 in reference to a flow chart.

In a first step S1, the control device 5 ascertains a desired power vector $i_{target,dq}$ according to a specified desired torque $T_{target}$ on the one hand and an actual rotation angle $\theta_{actual}$ on the other hand. In this case, the desired torque $T_{target}$ is specified, e.g., according to an actuation of an acceleration pedal of the motor vehicle. The actual rotation angle $\theta_{actual}$ is sensed, e.g., by a rotation angle sensor associated with the rotor. The desired power vector $i_{target,dq}$ is a power vector relative to a rotor-fixed coordinate system. The power vector in this case describes the power vector of a torque-forming current $i_q$ on the one hand and the power value of a flow-forming current is on the other hand. The power vector corresponds to a power working point of the electric machine. In this respect, the desired power vector $i_{target,dq}$ of the electric machine 2 is the desired power working point of the electric machine 2.

In a second step S2, the control device 5 ascertains a difference between the desired power vector $i_{target,dq}$ on the one hand and an ascertained actual power vector $i_{actual,dq}$ on the other hand. For example, the actual power vector $i_{actual,dq}$ is ascertained according to the actual phase currents flowing through the phases of the motor winding by means of a d/q transformation. The actual power vector $i_{actual,dq}$ corresponds to an actual power working point of the electric machine 2.

In a third step S3, the control device 5 ascertains a desired voltage vector $U_{target,dq}$ relative to the rotor-fixed coordinate system by means of the power controller 8. The desired voltage vector $U_{target,dq}$ describes clamping voltages to be applied to the phases of the stator winding so that the difference between the desired power vector $i_{target,dq}$ and the actual power vector $i_{actual,dq}$ is reduced.

In a fourth step S4, the control device 5 ascertains triggering signals for the switching elements of the power electronics 3 according to the desired voltage vector $U_{target,dq}$.

In a fifth step S5, the control device 5 controls the switching elements according to the triggering signals ascertained in step S4.

Steps S1 to S5 are performed continuously during normal operation of the electric machine 2 so that field-oriented control of the electric machine 2 is performed by means of steps S1 to S5.

In a sixth step S6, a threshold power value for the actual power vector $i_{actual,dq}$ as well as a threshold voltage for the clamping voltages is specified.

In a seventh step S7, the control device 5 ascertains a desired trajectory for the actual power vector $i_{actual,dq}$ by means of the model predictive controller 9, in which case the desired trajectory extends from the current actual working point of the machine 2 to a specified desired working point. In the present case, as a desired working point, the working point of the electric machine 2 is specified in which the machine 2 generates a maximum deceleration torque.

The model predictive controller 9 in this case ascertains the desired trajectory such that a time-optimized setting of the desired working point starting from the current actual working point is achieved by changing the actual power vector $i_{actual,dq}$ along the desired trajectory. For this purpose, the model predictive controller 9 ascertains the desired trajectory according to a model of the electric machine 2.

The model predictive controller 9 also considers the specified threshold power value when determining the desired trajectory. For this purpose, the model predictive controller 9 ascertains the desired trajectory such that the actual power vector $i_{actual,dq}$ always falls below the threshold power value when setting the desired working point along the desired trajectory.

The model predictive controller 9 also considers the specified threshold voltage value when determining the desired trajectory. For this purpose, the model predictive controller 9 ascertains the desired trajectory such that the clamping voltages always fall below the threshold voltage value when setting the desired working point along the desired trajectory.

In an eighth step S8, the model predictive controller 9 predicts a pilot control action according to the ascertained desired trajectory. In the present case, the model predictive controller 9 predicts a control sequence comprising a plurality of rotor-fixed coordinate system-based optimized voltage vectors $u_{opt,dq}$. If the phases are sequentially applied to electrical clamping voltages according to the voltage vectors $u_{opt,dq}$, then the specified desired working point of the machine 2 is set based on the current working point of the machine 2 such that the curve of the power vector $i_{actual,dq}$ at least substantially corresponds to the desired trajectory.

Steps S6 to S8 are performed continuously so that a desired trajectory is always ascertained and a pilot control action is predicted for the current working points of the machine 2.

In a ninth step S9, it is monitored whether the specified desired working point of the electric machine 2 should be set in a time-optimized manner, i.e. as quickly as possible, based on the current actual working point of the electric machine 2. This is the case, for example, when an emergency braking situation is ascertained or is present.

If it is ascertained in step S9 that the desired working point should be set in a time-optimized manner, then the triggering signals are ascertained in step S4 according to the predicted pilot control action. The consideration of the desired voltage vector $U_{target,dq}$ is suspended. Accordingly, in step S5, the switching elements are triggered according to triggering signals that were ascertained according to the predicted pilot control action. The specified desired working point is thus set faster than would be the case using field-oriented control. This ultimately reduces the braking distance of the motor vehicle.

According to a further exemplary embodiment, the pilot control action is predicted in pilot control action tests, i.e. "off-line," and stored in a data memory associated with the machine 2. Preferably, a pilot control action is respectively predicted for a plurality of potential actual working points, in which case the pilot control actions are then preferably stored in a characteristic map. If it is ascertained in this case that a specified desired working point should be set starting from a current actual working point, then the corresponding pilot control action is not predicted according to method steps S7 and S8 but rather provided by the data memory.

Figure 3:
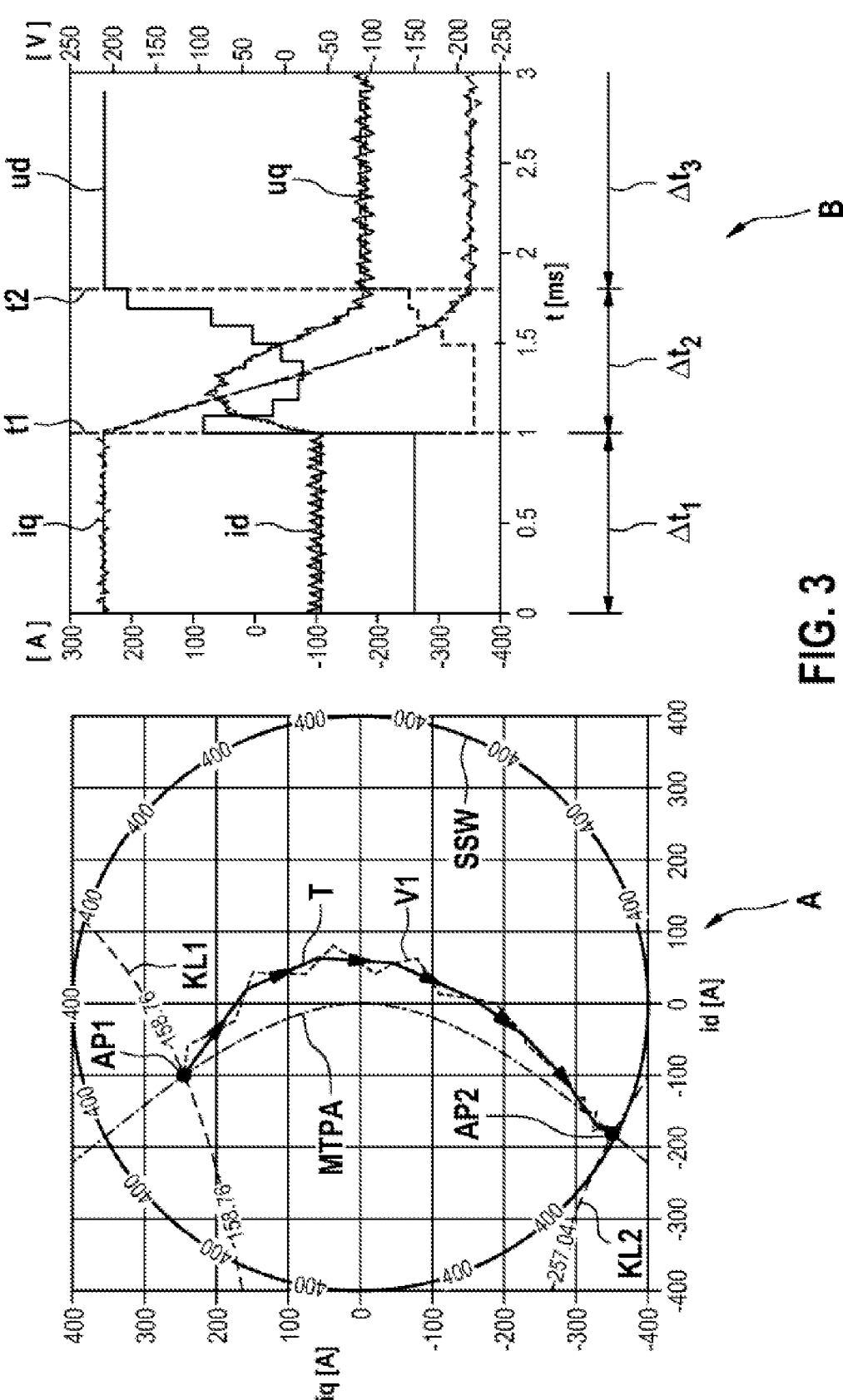
FIG. 3 a graph of the setting of a desired working point according to a predicted pilot control action, and FIG. 4 a graph of the setting of the desired working point by means of a power controller.

FIG. 3 shows a graph of the setting of the specified desired working point AP2 based on the current actual working point AP1 according to the predicted pilot control action.

In illustration A at left, a power locus curve is shown for this purpose. As can be seen from FIG. 3, the threshold power value SSW in the present case is 400 amperes. The current actual working point AP1 corresponds to an intersection point of a first ISO torque characteristic curve KL1 with the MTPA curve. The specified desired working point AP2 corresponds to an intersection point of a second ISO torque characteristic curve KL2 with the MTPA curve.

The desired trajectory T follows an ego dynamics of the electric machine 2. The curve V1 of the actual power vector $i_{actual,dq}$ corresponds to the desired trajectory T when setting the desired working point AP2 according to the pilot control action.

In illustration B at right, a temporal curve of a torque-forming current $i_q$ and a flow-forming current is when setting the second working point AP2 according to the predicted pilot control action are shown. The torque-forming power $i_q$ corresponds to a first directional component of the power vector $i_{actual,dq}$. The flow-forming power is corresponds to a second directional component of the power vector $i_{actual,dq}$. A temporal curve of a torque-forming voltage $u_q$ and a flow-forming voltage $u_d$ are also shown. The torque-forming voltage $u_q$ corresponds to a first directional component of the optimized voltage vectors $u_{opt,dq}$. The flow-forming voltage $u_d$ corresponds to a second directional component of the optimized voltage vectors $u_{opt,dq}$.

During a first time interval $\Delta t1$, the machine 2 is in the current actual working point AP1. During the first time interval $\Delta t1$, the model predictive controller 9 predicts the pilot control action for the current actual working point AP1.

At a time t1, it is ascertained that the desired working point AP2 should be set in time-optimized manner. As a result, the switching elements of the power electronics 3 are triggered during a second time interval $\Delta t2$ according to the predicted pilot control action. In the present case, the pilot control action comprises eight optimized voltage vectors $u_{opt,dq}$, which are sequentially used as the basis for triggering the switching elements. According to the present example, by triggering the switching elements according to the predicted pilot control action, it is achieved that the second working point AP2 is already set after 800 μs, starting from the first working point AP1.

Figure 4:
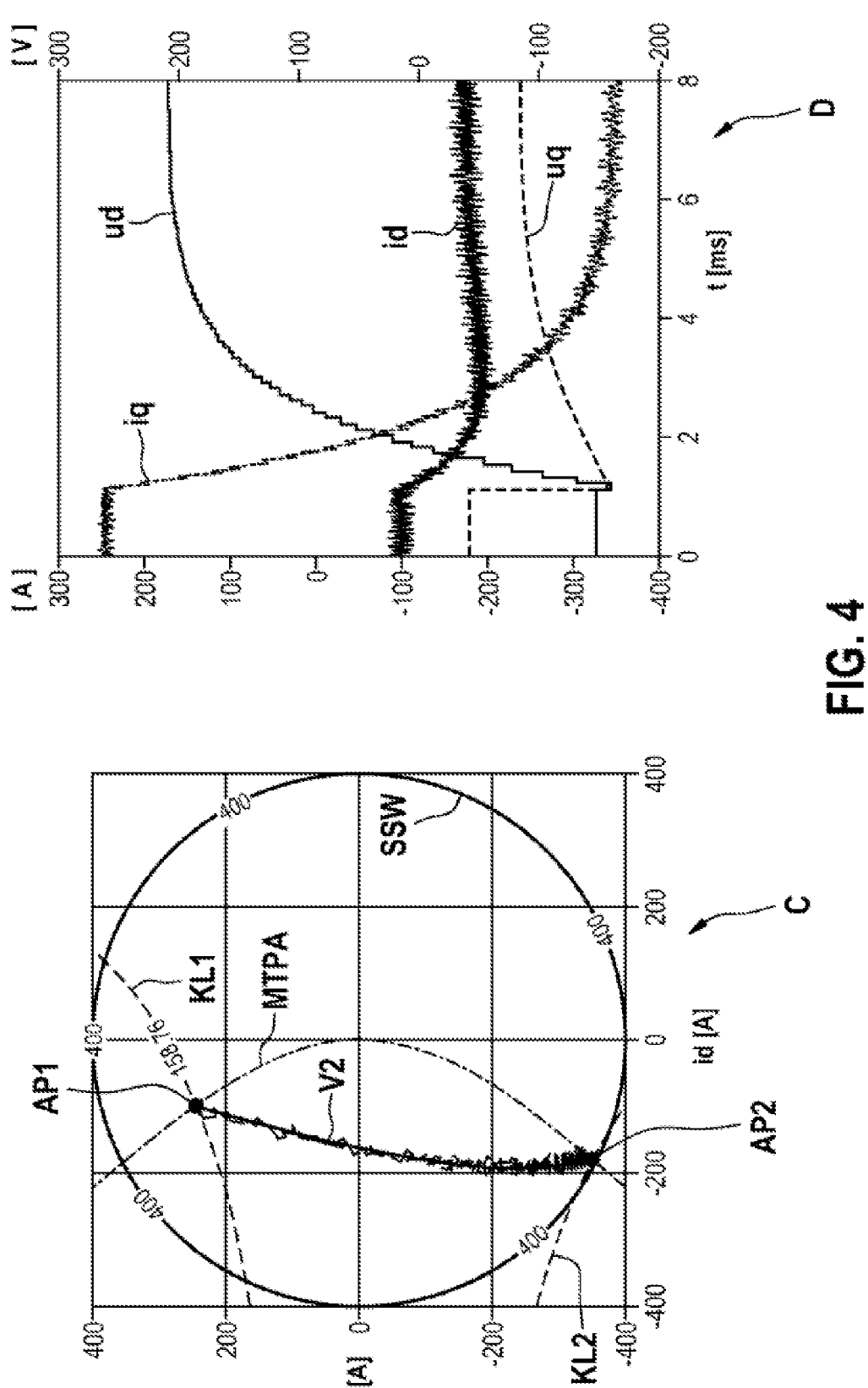

FIG. 4 shows a graph of the setting of the specified desired working point AP2 starting from the current actual working point AP1 by means of field-oriented control.

In illustration C at left, a power locus curve is shown for this purpose. As can be seen from FIG. 3, the curve V2 of the actual power vector $i_{actual,dq}$ differs significantly from the curve V1 shown in illustration A when using field-oriented control.

In illustration D at right, the temporal curve of the torque-forming current $i_q$ and the temporal curve of the flow-forming current is when setting the desired working point AP2 are shown using field-oriented control. The temporal curve of the torque-forming voltage $u_q$ and the temporal curve of the flow-forming voltage $u_d$ are also shown. As can be seen from illustration D, about 5 ms are required for setting the desired working point AP2 by means of field-oriented control.

By triggering the switching elements according to the predicted pilot control action, the time required for setting the desired working point AP2 can accordingly be significantly reduced compared to the field-oriented control.

The invention claimed is:

1. A method for operating an electric machine, wherein the machine (2) comprises a rotatably mounted rotor and a motor winding, wherein the motor winding is electrically connected to an electrical energy store (4) by means of a power electronics (3), the method comprising:

triggering the power electronics (3) to control the electric machine (2) in a field-oriented manner so that the machine (2) generates a specified desired torque (T$_{target}$), determining, based on a current actual working point (AP1) of the electric machine (2), that a specified desired working point (AP2) of the electric machine (2) should be set in a time-optimized manner, setting, the desired working point (AP2) by triggering the power electronics (3) according to a predicted pilot control action that is specified, wherein the predicted pilot control action is specified in response to determining that the specified desired working point (AP2) of the electric machine (2) should be set in a time-optimized manner, and wherein the predicted pilot control action includes a plurality of desired voltage vectors, and suspending field-oriented control of the electric machine (2) in response to determining that the desired working point (AP2) should be set in a time-optimized manner.

2. The method according to claim 1, wherein the pilot control action is predicted according to the current actual working point (AP1) in the operation of the electric machine (2).

3. The method according to claim 1, wherein the pilot control action is predicted in pilot control action tests and stored in a data memory associated with the machine (2).

4. The method according to claim 1, wherein one pilot control action is respectively predicted for a plurality of potential desired working points (AP2) and/or that one pilot control action is respectively predicted for a plurality of potential actual working points (AP1).

5. The method according to claim 1, wherein a sensor signal of a sensor is compared to a specified threshold value, and determining, according to the comparison, that the desired working point (AP2) should be set in a time-optimized manner.

6. The method according to claim 1, wherein a working point is specified as the desired working point (AP2) in which the machine (2) generates a generative deceleration torque, wherein, upon detection of an emergency braking situation, it is determined that the desired working point (AP2) should be set in a time-optimized manner and a working point is specified as the desired working point (AP2) in which the machine (2) generates an acceleration torque, and wherein, upon detection of a maximum dynamic default, it is determined that the desired working point (AP2) should be set in a time-optimized manner.

7. The method according to claim 1, wherein the desired working point (AP2) is specified according to a state of charge of the energy store (4).

8. The method according to claim 1, wherein a desired trajectory (T) for an actual power vector (i$_{actual,dq}$) of an electric motor current flowing through the motor winding is ascertained, wherein the desired trajectory (T) extends from the actual working point (AP1) to the desired working point (AP2), and wherein the pilot control action is predicted according to the desired trajectory (T) such that a curve of the actual power vector (iactual,dq) at least substantially corresponds to the desired trajectory (T) when setting the desired working point (AP2).

9. The method according to claim 8, wherein the desired trajectory (T) is ascertained according to a model of the electric machine (2).

10. The method according to claim 8, wherein a threshold power value (SSW) is specified and that the desired trajectory (T) is ascertained according to the threshold power value (SSW) such that a power value of the actual power vector (i$_{actual,dq}$) always falls below the threshold power value (SSW) when setting the desired working point (AP2).

11. The method according to claim 8, wherein a threshold voltage value is specified and that the desired trajectory (T) is ascertained according to the threshold voltage value such that voltage values of electrical clamping voltages of the machine (2) always fall below the threshold voltage value when setting the desired working point (AP2).

12. The method according to claim 8, wherein the desired trajectory (T) is ascertained by a predictive controller (9).

13. A device for operating an electric machine, wherein the machine (2) comprises a rotatably mounted rotor and a motor winding, and wherein the motor winding is electrically connected to an electrical energy store (4) by means of a power electronics (3), wherein a control device (5) is configured to perform the method according to claim 1.

14. The device according to claim 13, wherein the control device (5) comprises a first computing unit (6) and a second computing unit (7), wherein the first computing unit (6) comprises a power controller (8), and wherein the second computing unit (7) comprises a model predictive controller (9).

15. The method according to claim 1, wherein the predicted pilot control action is a control sequence including the plurality of desired voltage vectors.

16. An electrical drive system comprising:

an electrical machine (2) having a rotatably mounted rotor and a motor winding, wherein the motor winding is electrically connected to an electrical energy store (4) by means of a power electronics (3), and a control device (5) configured to trigger the power electronics (3) to control the electric machine (2) in a field-oriented manner so that the machine (2) generates a specified desired torque (T$_{target}$), wherein when it is determined, based on a current actual working point (AP1) of the electric machine (2), that a specified desired working point (AP2) of the electric machine (2) should be set in a time-optimized manner, set the desired working point (AP2) by triggering the power electronics (3) according to a predicted pilot control action, wherein the predicted pilot control action is specified in response to determining that the specified desired working point (AP2) of the electric machine (2) should be set in a time-optimized manner, and wherein the predicted pilot control action includes a plurality of desired voltage vectors, and suspend field-oriented control of the electric machine (2) in response to determining that when the desired working point (AP2) should be set in the a time-optimized manner.

* * * * *